(12) United States Patent
Drüke

(10) Patent No.: US 9,175,707 B2
(45) Date of Patent: Nov. 3, 2015

(54) CONNECTING ELEMENT FOR GLUING ONTO A COMPONENT SURFACE AND REPRODUCTION METHOD AND ATTACHMENT METHOD THEREFOR

(75) Inventor: Franz Drüke, Leopoldshöhe (DE)

(73) Assignee: Böllhoff Verbindungstechnik GmbH (DE)

( * ) Notice: Subject to any disclaimer, the term of this patent is extended or adjusted under 35 U.S.C. 154(b) by 341 days.

(21) Appl. No.: 13/984,439

(22) PCT Filed: Feb. 9, 2012

(86) PCT No.: PCT/EP2012/000616
§ 371 (c)(1),
(2), (4) Date: Aug. 8, 2013

(87) PCT Pub. No.: WO2012/107240
PCT Pub. Date: Aug. 16, 2012

(65) Prior Publication Data
US 2013/0336740 A1    Dec. 19, 2013

(30) Foreign Application Priority Data

Feb. 9, 2011   (DE) .......................... 10 2011 000 603

(51) Int. Cl.
*F16B 39/02* (2006.01)
*F16B 19/00* (2006.01)
*F16B 11/00* (2006.01)

(52) U.S. Cl.
CPC ............. *F16B 19/00* (2013.01); *F16B 11/006* (2013.01)

(58) Field of Classification Search
CPC .................................. F16B 19/00; F16B 39/02
USPC ........................... 411/82, 82.5, 258, 909, 930
See application file for complete search history.

(56) References Cited

U.S. PATENT DOCUMENTS

| 3,532,316 | A |   | 10/1970 | Mathes |   |
|---|---|---|---|---|---|
| 4,167,259 | A | * | 9/1979 | Bury | 248/205.3 |
| 4,367,255 | A | * | 1/1983 | Blohm | 428/99 |
| 4,433,930 | A | * | 2/1984 | Cosenza | 403/12 |
| 4,493,577 | A | * | 1/1985 | Cosenza | 403/41 |
| 4,632,944 | A | * | 12/1986 | Thompson | 522/11 |

(Continued)

FOREIGN PATENT DOCUMENTS

| DE | 6808669 U | 4/1969 |
|---|---|---|
| DE | 9015241 U1 | 2/1991 |

(Continued)

OTHER PUBLICATIONS

Erlemann & Huckenbeck GmbH & Co. KG: Kreuzgriff DIN 6335. URL: http://www.erlemann-huckenbeck.de [recherchiert am Oct. 25, 2011].

(Continued)

*Primary Examiner* — Roberta Delisle
(74) *Attorney, Agent, or Firm* — Barclay Damon, LLP

(57) ABSTRACT

The connecting element 1 for gluing onto a component surface B comprises a retaining pin 10 having a pin section 20, to which a structural component can be attached. An anchor 30 of the retaining pin 10 is attached in a disk 40 made of a material which can be penetrated by light such that due to the rotation-inhibiting and removal-inhibiting shape of the anchor, a reliable connection is established between the retaining pin 10 and the disk 40.

20 Claims, 14 Drawing Sheets

(56) References Cited

U.S. PATENT DOCUMENTS

Figure 1:
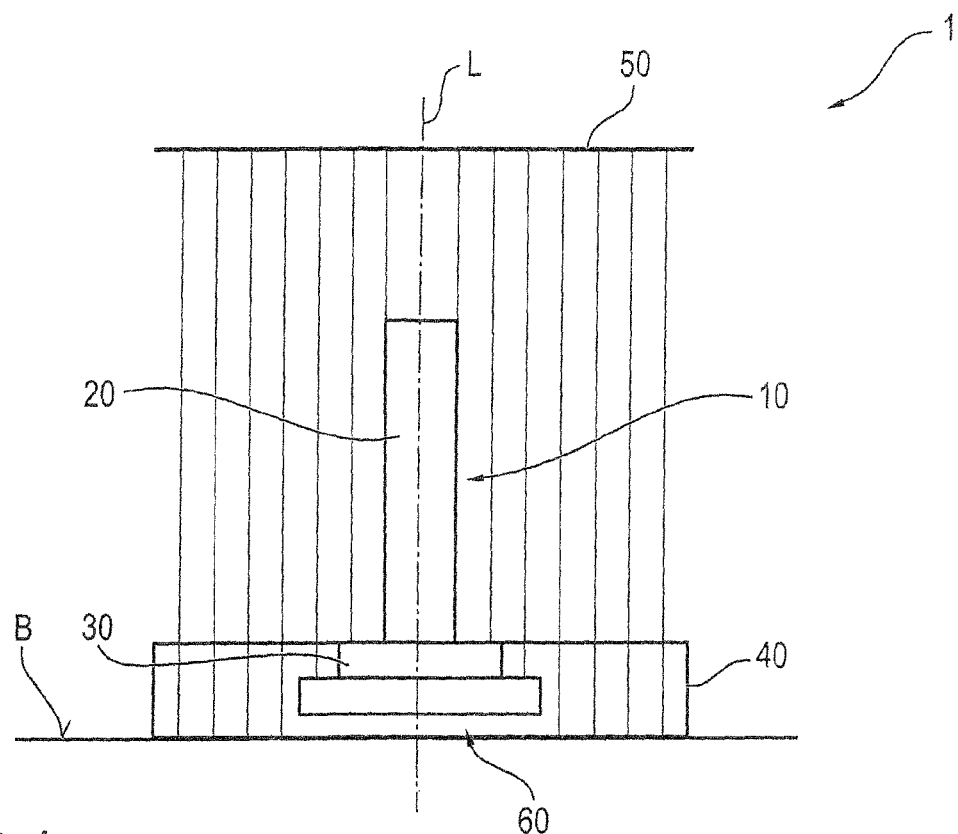

| | | | |
|---|---|---|---|
| 4,778,702 A * | 10/1988 | Hutter, III | 428/40.9 |
| 4,842,912 A | 6/1989 | Hutter, III | |
| 5,756,185 A | 5/1998 | Lesser | |
| 6,431,508 B1 | 8/2002 | Courson et al. | |
| 6,773,780 B2 * | 8/2004 | Hutter, III | 428/40.1 |
| 7,815,988 B2 * | 10/2010 | Stumpf et al. | 428/40.1 |
| 8,663,417 B2 * | 3/2014 | Braun | 156/275.5 |
| 8,919,405 B2 * | 12/2014 | Druke | 156/358 |
| 2004/0105735 A1 * | 6/2004 | Favre-Bulle et al. | 411/147 |
| 2012/0090777 A1 | 4/2012 | Braun | |

FOREIGN PATENT DOCUMENTS

| | | |
|---|---|---|
| DE | 103 59 466 A1 | 7/2004 |
| DE | 10 2006 012 411 A1 | 10/2005 |
| DE | 10 2007 048 022 A1 | 4/2009 |
| DE | 10 2009 003 391 A1 | 7/2010 |
| DE | 10 2009 031 188 A1 | 12/2010 |
| EP | 0 54 957 A2 | 9/1992 |
| EP | 0 54 957 A3 | 9/1992 |
| EP | 0 741 842 B1 | 4/1999 |
| EP | 1 486 314 A1 | 12/2004 |
| GB | 564225 | 9/1944 |
| JP | 08-280414 | 10/1996 |
| JP | 2003-266543 | 9/2003 |
| JP | 2005-347637 | 12/2005 |
| JP | 2008-304054 | 12/2008 |

OTHER PUBLICATIONS

Erlemann & Huckenbeck GmbH & Co.KG Technische Informationen. URL: http://www.erlemann-huckenbeck.de/techinfo.php?lang=de [recherchiert am Oct. 25, 2011].

International Preliminary Report on Patentability and Written Opinion for PCT Application No. PCT/EP2012/000616; dated Aug. 13, 2013 (12 pages).

Japanese Office Action for JP 2013-552889; dated: Nov. 11, 2014; 4 pages.

* cited by examiner

CONNECTING ELEMENT FOR GLUING ONTO A COMPONENT SURFACE AND REPRODUCTION METHOD AND ATTACHMENT METHOD THEREFOR

CROSS-REFERENCE TO RELATED APPLICATION

This application is a national stage application pursuant to 35 U.S.C. §371 of International Application No. PCT/EP2012/000616, filed Feb. 9, 2012, which claims priority upon German Patent Application No. 10 2011 000 603.6, filed Feb. 9, 2011, the entire contents of each application herein being incorporated by reference.

FIELD OF THE INVENTION

The present invention relates to a connecting element for gluing onto a component surface, a production method for this connecting element, and an attachment method for the connecting element on the component surface.

BACKGROUND OF THE INVENTION

Several connecting elements are known from the prior art, which can be attached to a component surface with the aid of heat activated glue or hot melt adhesive. These connecting elements are described, for example, in the documents EP 0 741 842 B1, U.S. Pat. No. 3,3532,316, DE 103 59 466 A1, EP 0 504 957 A2 and DE 10 2006 012 411 A1.

For attaching these connecting elements to a component surface, the connecting elements have a disk or disk-like structure. This disk comprises an attachment surface that faces toward the component surface. The hot melt adhesive, for example, is applied on the attachment surface, and then activated by heat supply, and is cured. Various designs of these connecting elements show a flat attachment surface, an attachment surface having webs or supporting projections, and a depression-shaped attachment surface which receives the hot melt adhesive.

These connecting elements frequently have the problem that although the disk is sufficiently attached on the component surface, the pin fastened in the disk does not withstand the mechanical loading, for example, during the attachment of a structural component. This leads to a premature failure of the attachment of the structural component, even though the connecting element remains sufficiently attached to the component surface.

A further disadvantage is that the known connecting elements are designed for using heat activated glue. If, in contrast, a glue is used that is activated or cured by light, the light irradiated from outside does not reach the glue at all, or reaches it with an intensity that is too low, due to the non-transparency of the connecting element. This leads to the glue being insufficiently cured, and thus, the connecting element cannot be reliably attached on the component surface.

Therefore, it is the object of the present invention to provide a connecting element for gluing onto a component surface using a light curing glue. A further object is to provide a production method and an attachment method for this connecting element.

SUMMARY OF THE INVENTION

The above object is achieved by a connecting element according to the independent claims 1, 9 and 14, a production method for this connecting element according to the independent claims 10 and 20, and an attachment method for a connecting element according to the independent claims 13 and 18. Further developments and advantageous designs of the present invention arise from the description, the accompanying drawings and the dependent claims.

The connecting element according to the invention for attaching on a component surface so that a part can be attached thereto, has the following features: a retaining pin having a pin section to which a part can be attached, and having an anchor and a disk made of a material, which can be penetrated by light, in which the retaining pin is fastened using the anchor having a rotation-inhibiting and removal-inhibiting shape, such that the retaining pin is arranged twist-proof and removal-proof in the disk due to the anchor.

The connecting element according to the invention is suited to the attachment using a light activated or light curing glue. For this purpose, the disk of the connecting element is produced from a transparent material so that the light from all spatial directions can reach the light sensitive glue underneath the disk or on the component surface. In order to be able to reliably attach the retaining pin of the connecting element in the disk, a special anchor of the retaining pin is formed in the disk. This anchor is structured so that it prevents rotation of the retaining pin about its longitudinal axis within the disk, and prevents removal of the retaining pin from the disk.

For this purpose, the anchor has, with respect to the longitudinal axis of the retaining pin, an undercut in the shape of a lateral, preferably radial enlargement. This enlargement, which in one preferred design is a flat structure arranged transverse or at an angle unequal 90° to the longitudinal axis of the retaining pin, comprises a larger cross-section than that of the retaining pin. This larger cross-sectional dimension of the anchor compared to the retaining pin, prevents the retaining pin from tilting within the disk, and ensures an introduction of mechanical loads from the retaining pin into the entire disk of the connecting element.

In order to permit irradiation of light even in the region beneath the retaining pin at the attachment surface of the disk, the flat or two-dimensional structure of the anchor is preferably discontinuous in partial regions. It is also preferred to form the anchor as a closed flat structure. According to a further embodiment, the anchor has a cone-shaped or truncated cone-shaped cross-section, so that incident light from above is less shaded than would be the case if the anchor had a cylindrical shape.

It is further preferred to equip the flat or two-dimensional anchor on one side facing toward or away from the pin section, or on both sides, with at least one web projecting outward, running transverse to the longitudinal axis of the retaining pin that forms an anti-rotation lock of the anchor in the disk. Because the material of the disk surrounds such a web projecting in the longitudinal direction of the retaining pin, an undercut is formed in the direction of rotation about the longitudinal axis of the retaining pin. In this manner, the retaining pin is stabilized if a nut, or a similar element, is to be screwed onto a thread of the retaining pin. In this context, a preferred embodiment consists in that the flat anchor is formed round, and to dispose a plurality of webs, running in the radial direction of the anchor, on the side of the anchor facing away from the pin section.

According to a further embodiment of the present invention, the anchor comprises an embossing, which provides an anti-rotation lock or antitwist protection and an anti-removal protection.

The disk of the connecting element comprises a top surface adjacent to the retaining pin and an attachment surface for placement on the component surface. The top surface of the disk is equipped with a surface roughness for scattering incident light for supporting the incidence of light and the transport of light to the light-activated glue on the attachment surface of the disk. This surface roughness guarantees that incident light for curing or activating the glue is not reflected. In addition, the light is introduced through this rough surface into the disk of the connecting element, so that within the disk made of material, which can be penetrated by light, the irradiated light can be conducted further to the attachment surface, and thus to the glue.

It is further preferable that the top surface and attachment surface of the disk are connected with each other using a peripheral connecting surface which is formed at least partially concave.

It was determined that specifically the concave shape also contributes to supporting the further conductance of the incident light to the glue, or respectively to the attachment surface of the disk.

The present invention also discloses a connecting element made of a material, which can be penetrated by light, for gluing onto a component surface, so that a part can be attached thereto, wherein the connecting element has the following features: a retaining pin with a pin section, to which the part can be attached, and a disk, which has a top surface adjacent to the retaining pin and an attachment surface for placement on the component surface, wherein the top surface has a surface roughness for scattering incident light and/or a concave shaped connecting surface, which connects the top surface and attachment surface with each other.

According to the present invention, it is also preferred to produce the connecting element from only one material. This production route is associated with certain simplifications because the retaining pin and the disk do not need to be separately connected with each other. Additionally, this provides the possibility to produce the connecting element from a plastic which can be penetrated by light, for example, in only one molding step. In the same manner as already described above, the design of the disk with this connecting element has a surface roughness and a concave edge shape so that incident light is conducted for activating and/or curing the glue to the attachment surface of the disk, or respectively to the glue layer. Specifically this design of the disk prevents a loss of light intensity which supports shortening the cycle time with attaching such connecting elements.

The present invention additionally discloses a production method for a connecting element, as already described, that has the following steps: Providing a retaining pin having at least one pin section and an anchor, preferably composed of metal by means of cold pressing, machining production methods, injection molding, pressure casting or die casting or another metal forming process or from plastic, and attaching a disk to the anchor such that the retaining pin and the disk are connected together secured against rotation and removal. According to a further embodiment of the production method, before the production of the disk, the anchor is positioned in a mold and transparent plastic is injected into the mold so that a top surface is formed adjacent to the retaining pin and an attachment surface is formed for placement on the component surface, wherein the top surface has a surface roughness for scattering incident light and/or a concave shaped connecting surface which connects the top surface and the attachment surface with each other. If materials for the disk are to be processed which display susceptibility for crack propagation due to mechanical stresses in the material, such as glycerin for example, then it is preferable to provide a thermal treatment of the connecting element for the relaxation of mechanical stresses that promote cracks. In the scope of the production method, it is alternatively preferred to produce the anchor of the retaining pin by embossing or knurling, so that likewise an anti-rotation lock and anti-removal protection of the retaining pin in the molded state in the disk is guaranteed.

The present invention also discloses an attachment method for the connecting elements, described above, on a component surface, which has the following steps: applying glue on the disk of the connecting element and/or the component surface, placing the connecting element on the component surface and exposing the glue to light, wherein incident light is scattered to the component surface through a surface roughness of the disk, and/or is diverted to the component surface by a concave surface shape of the disk.

The present invention additionally discloses a connecting element for gluing onto a component surface B, so that a part can be attached thereto, having the following features: a retaining pin having a pin section to which the part can be attached, and an anchor, which is arranged as a flat structure transverse or at an angle not equal to 90° to the longitudinal axis of the retaining pin, and is formed closed in the longitudinal direction of the retaining pin or interrupted at least to some extent, a disk made of a material which can be penetrated by light, in which the retaining pin is fastened using the anchor having a removal-inhibiting shape so that the retaining pin is arranged in the disk secured against removal due to the anchor, wherein an attachment surface of the connecting element in an inner region of the anchor and in an outer region is composed of a material which can be penetrated by light.

In comparison to the connecting element described above, here the attachment surface of the connecting element is formed by a surface section composed of plastic and with material which can be penetrated by light and by a surface section composed of a thermally conductive material. In particular, the disk is made of transparent plastic, through which light can fall on the glue on the attachment surface. The anchor forms the other part of the attachment surface so that heat, which is conducted via the retaining pin and the anchor, for example, to the attachment surface, can contribute to curing the glue located there. The anchor on the side thereof facing toward the pin and on the lateral side thereof is coated with the transparent plastic, or surrounded there by plastic. It is also preferred to glue on, to lock in, or respectively clip in, or otherwise fasten the plastic disk to the anchor. If the glue on the attachment surface is initially activated by light irradiation, there is a first fixing of the connecting element in the region of the attachment surface, which is composed of transparent plastic. A subsequent heat irradiation using, for example, a furnace, another source of heat or ambient heat, then ensures a complete curing of the glue on the attachment surface. It is also preferred after exposure of the glue/connecting element to light, to allow the glue to cure over a period of time, and without further supply of energy.

According to a preferred embodiment, the connecting element at the attachment surface thereof has a plurality of support points, preferably uniformly distributed, which bridge a transition region between the disk and the anchor. Alternatively, the support points are preferably arranged only on the anchor, or only on the disk. According to a further preferred embodiment, the support points are arranged on the anchor and the disk. Initially, these support points have a specific distance between the component surface and the attachment surface of the connecting element. This ensures that the glue located between the component surface and the attachment surface of the connecting element is not displaced completely when the connecting element is placed on the component surface. For this purpose, according to one alternative, the support points are realized in plastic. It is also preferred to provide the support points using a wave shape of the attachment surface, or respectively in the region of the anchor. A further embodiment consists in that a graining is to be provided on the anchor on the side facing away from the retaining pin, so that material displaced with the graining implements a sufficient distance between the attachment surface and the component surface.

It is further preferred if the anchor of the connecting element in an outer edge region is chamfered on the side facing away from the retaining pin in order to support the attachment of the support points and the disk.

The present invention additionally discloses an attachment method for the above described connecting element on a component surface, which has the following steps: applying glue on the disk and the anchors of the connecting element or the component surface, placing the connecting element on the component surface and exposing the glue to light, wherein incident light through a plastic, which can be penetrated by light, of the disk creates a first fixing of the connecting element on the component surface. According to a further embodiment of the attachment method, heat is supplied via the anchor and/or the component surface to the glue, so that as a result there is a further fixing of the connecting element on the component surface. According to one alternative, the heat to be supplied here is process controlled. This means, a specific quantity of heat, in coordination with the glue used under the fastening element, is specifically introduced or respectively supplied for curing the glue. According to a further alternative, the supplied heat, or also light, is not process controlled. This additional supply of energy results, for example, from other processing methods in which the component with the connecting element is further processed, for example, a thermal painting method. Therefore, this additional supply of energy is not adapted to the glue connection to be produced between the component and the connecting element. This supply of energy does, however, support the realization of the glue connection. It is also preferred after exposing the glue, or respectively the connecting element, to light, to allow the glue to cure for a period of time and without further supply of energy.

In addition, the present invention describes a production method for a connecting element, which was described above. This production method comprises the following steps: providing a retaining pin having a pin section and an anchor by means of cold pressing, a machining production method or another metal forming method, applying or attaching a disk to the anchor so that the retaining pin and the disk are connected together secured against removal and an attachment surface of the connecting element arises which is formed by the anchor and the disk.

BRIEF DESCRIPTION OF THE ACCOMPANYING DRAWINGS

Figure 2:
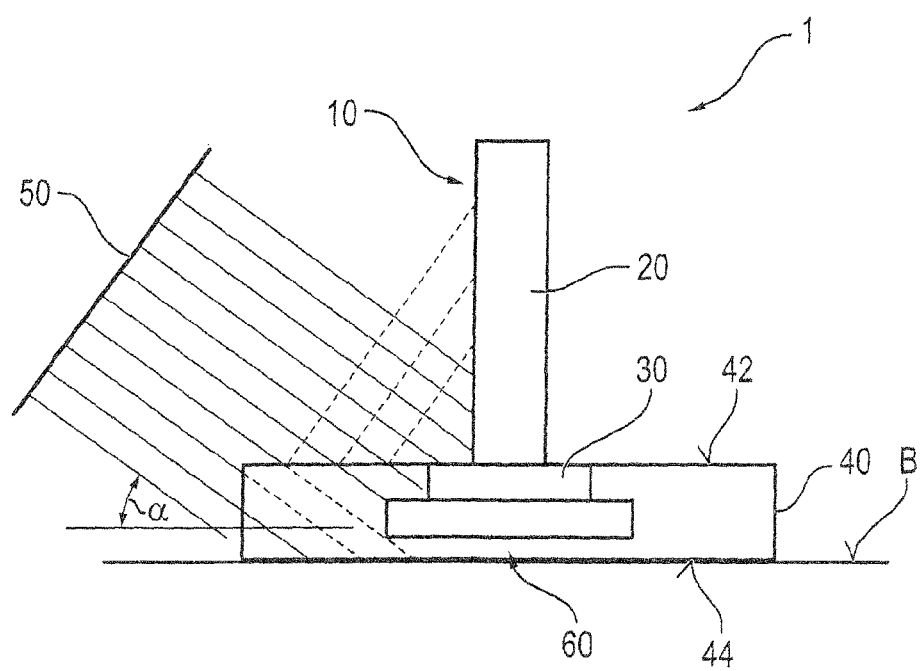
Figure 3:
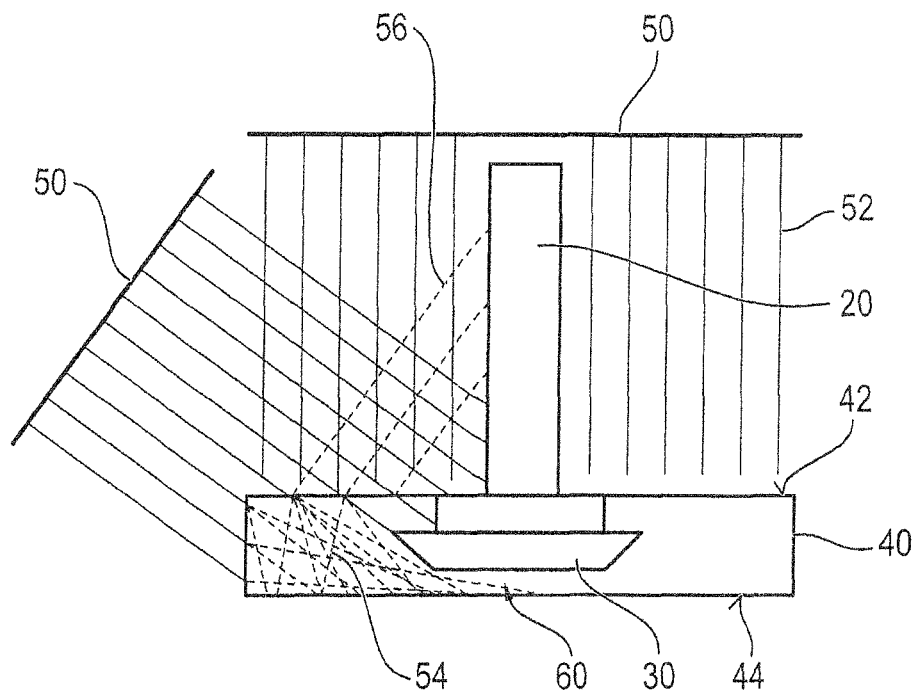
Figure 4:
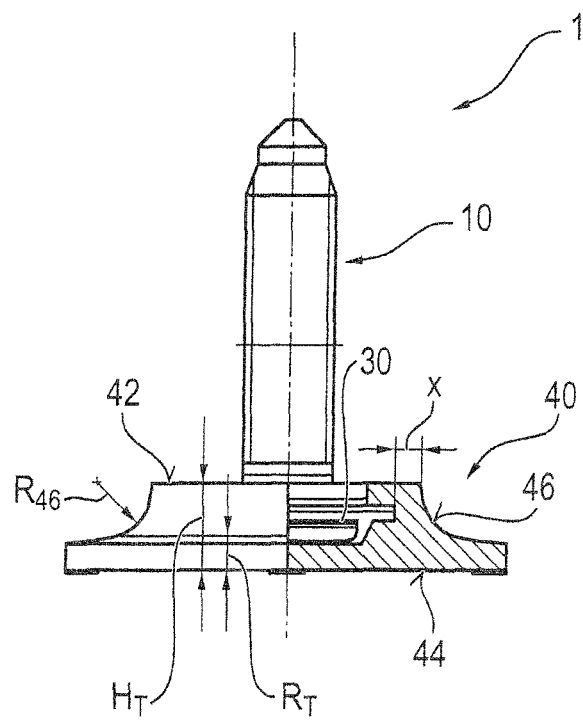
Figure 5:
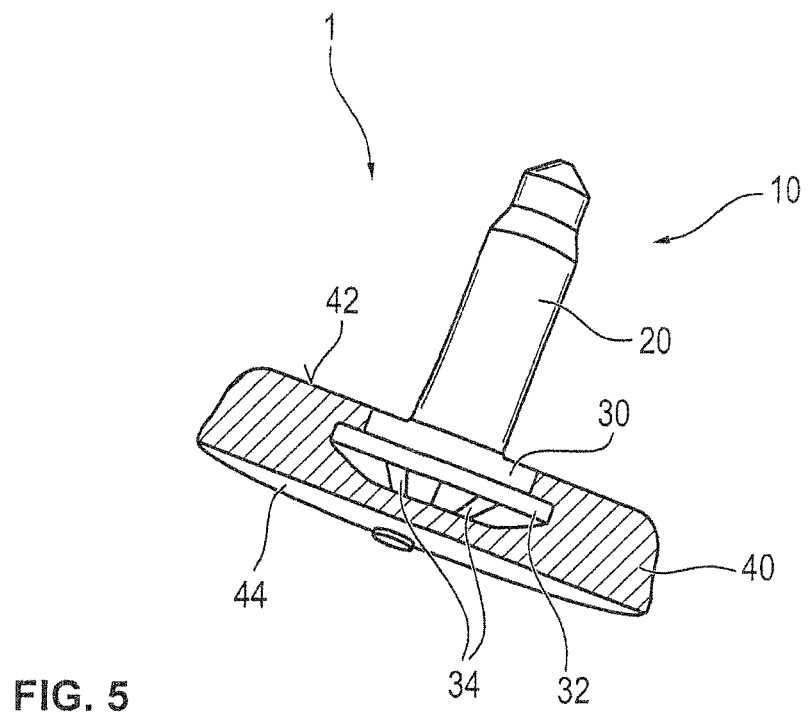
Figure 6:
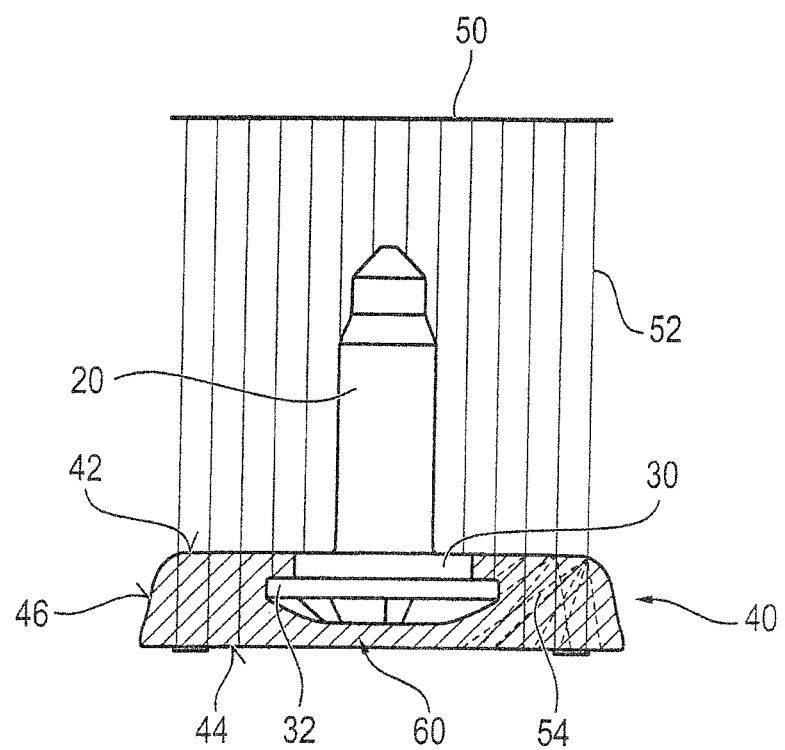
Figure 7:
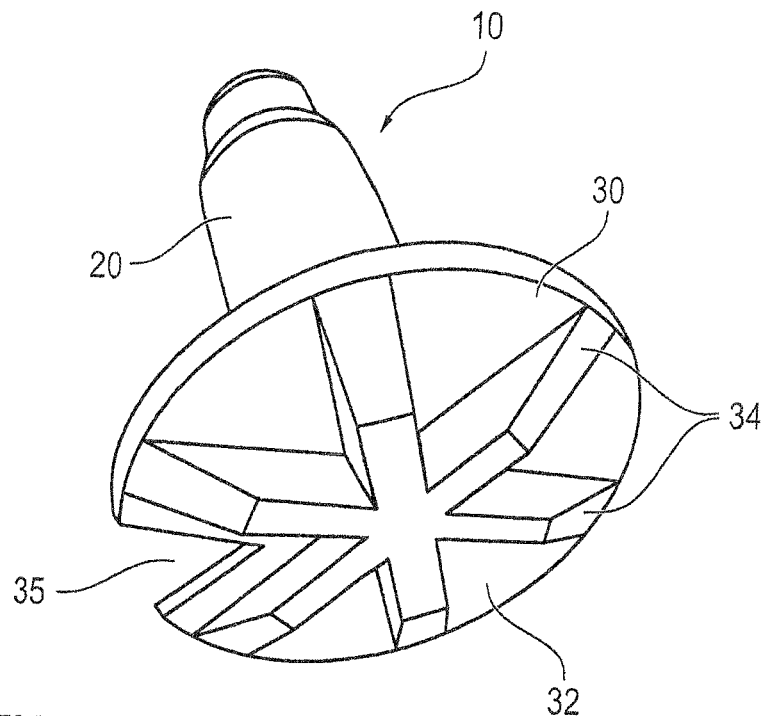
Figure 8:
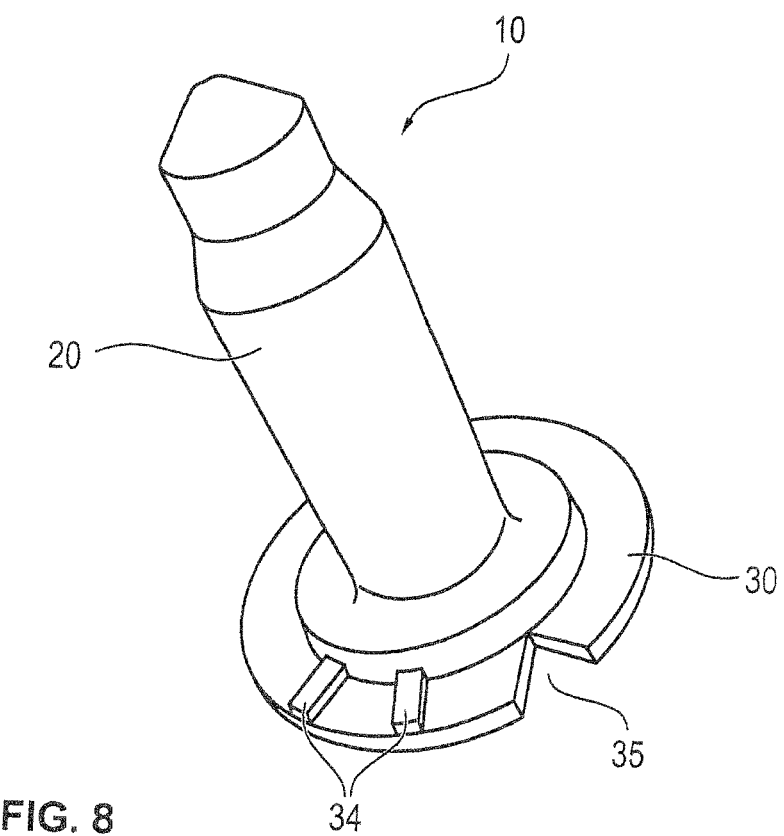
Figure 9:
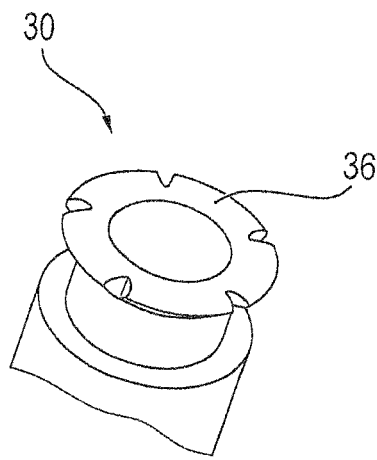
Figure 10:
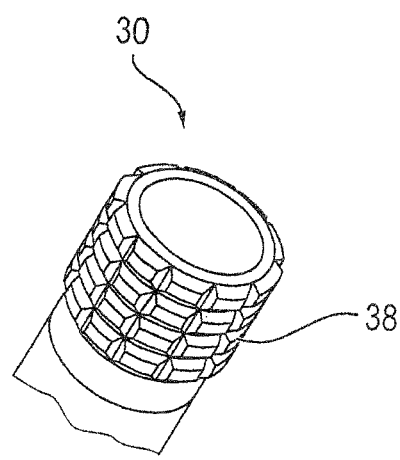
Figure 11:
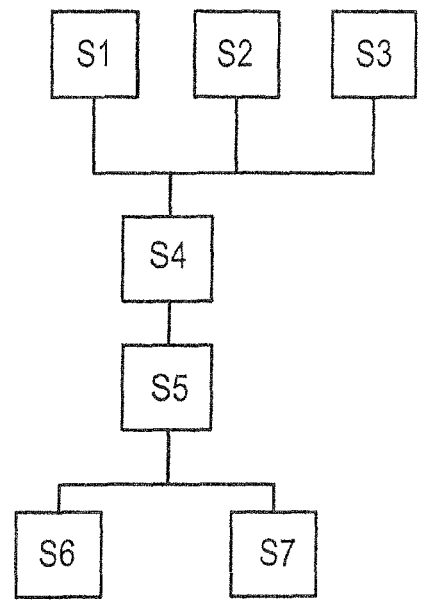
Figure 12:
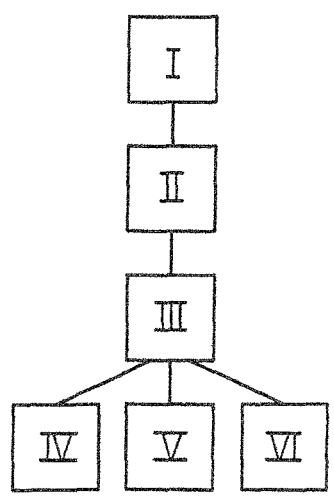
Figure 13:
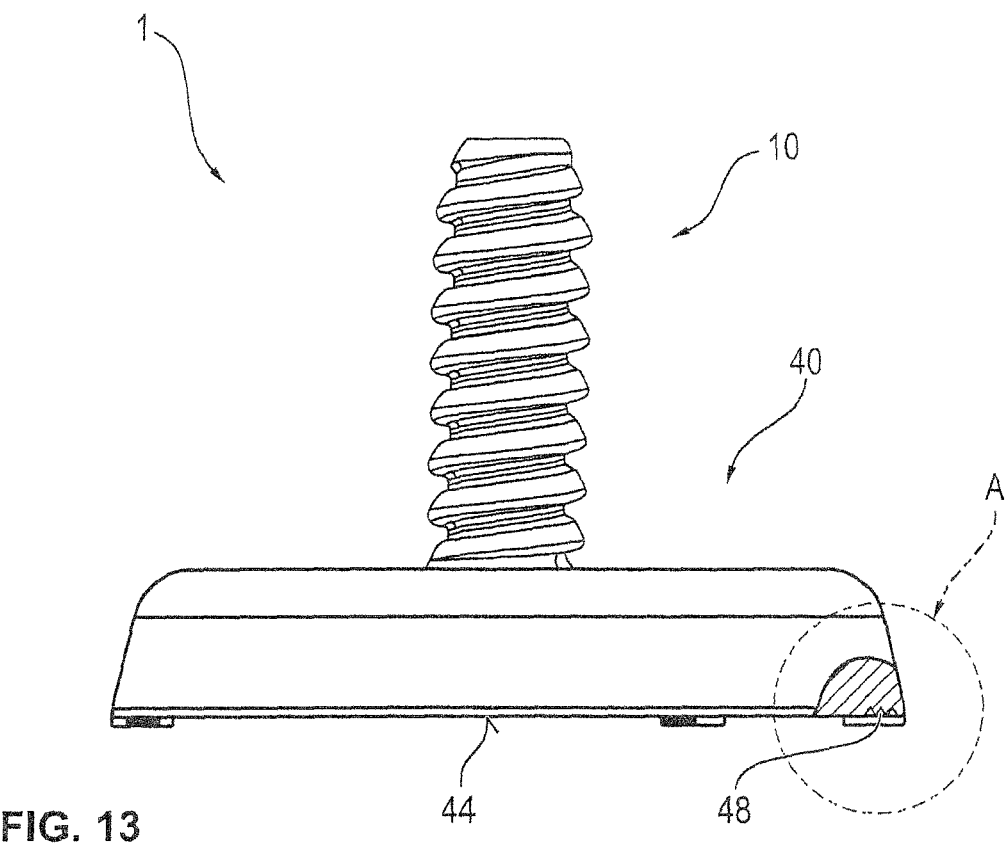
Figure 14:
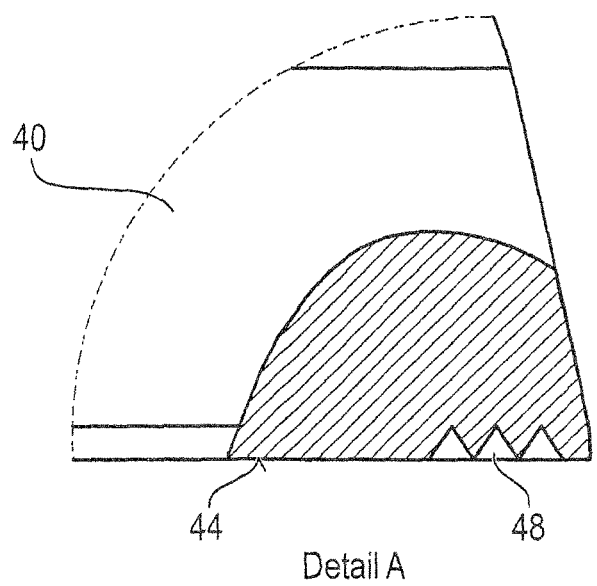
Figure 15:
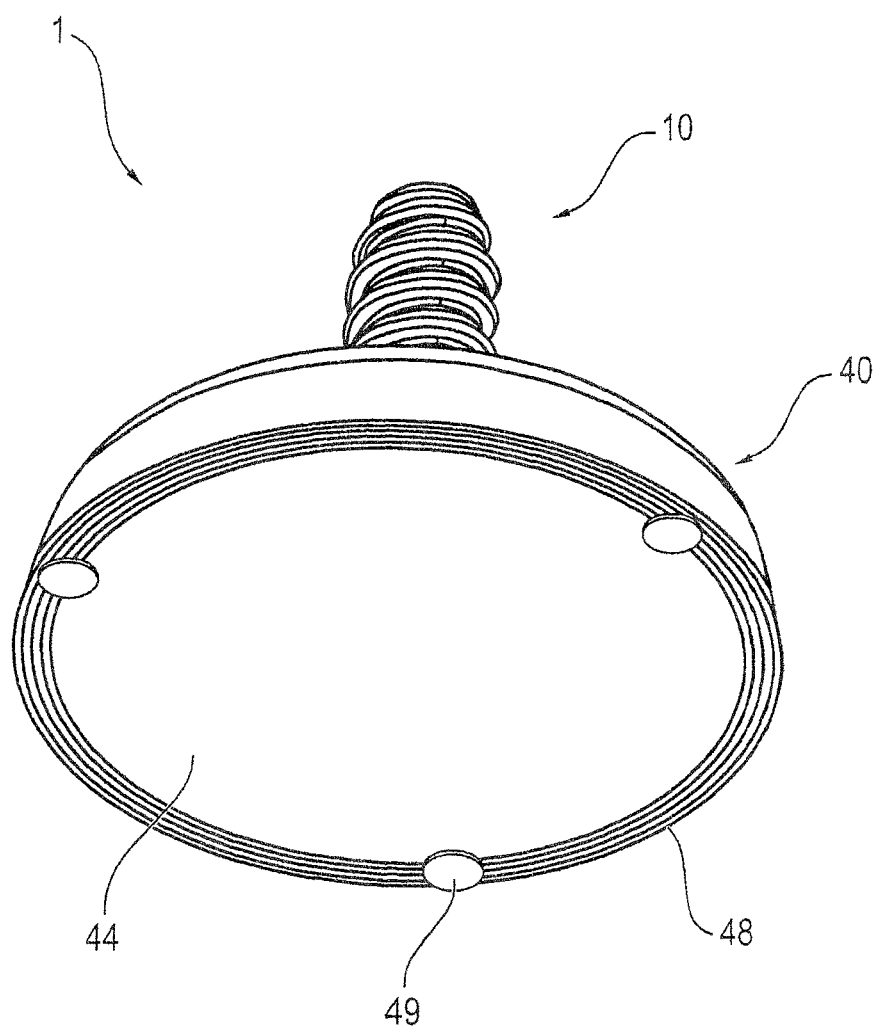

The present invention is explained in greater detail using the accompanying drawings. In the figures:

FIG. 1 shows a schematic side view of a preferred connecting element on a component surface, illuminated with light, FIG. 2 shows a schematic view of a preferred connecting element on the component surface illuminated with light from the side, FIG. 3 shows a schematic representation of a preferred embodiment of the connecting element and the effects of light irradiation, FIG. 4 shows a further preferred embodiment of the connecting element, FIG. 5 shows a side view of a sectional representation of a preferred embodiment of the connecting element, FIG. 6 shows a side view of a sectional representation of the connecting element from FIG. 5 with light irradiation, FIG. 7 shows a perspective view of a preferred embodiment of the retaining pin of the connecting element, FIG. 8 shows a perspective view of a further preferred embodiment of the retaining pin, FIG. 9 shows a preferred embodiment of the anchor of the retaining pin, FIG. 10 shows a further preferred embodiment of the anchor of the retaining pin, FIG. 11 shows a flow diagram of the preferred embodiment of the production method for a connecting element, FIG. 12 shows a flow diagram of a preferred embodiment of the attachment method for the connecting element, FIG. 13 shows a side view of a further embodiment of the connecting element 1, FIG. 14 shows an enlarged representation of the encircled region A from FIG. 13, and FIG. 15 shows a perspective view of the connecting element from FIG. 13.

Figure 16:
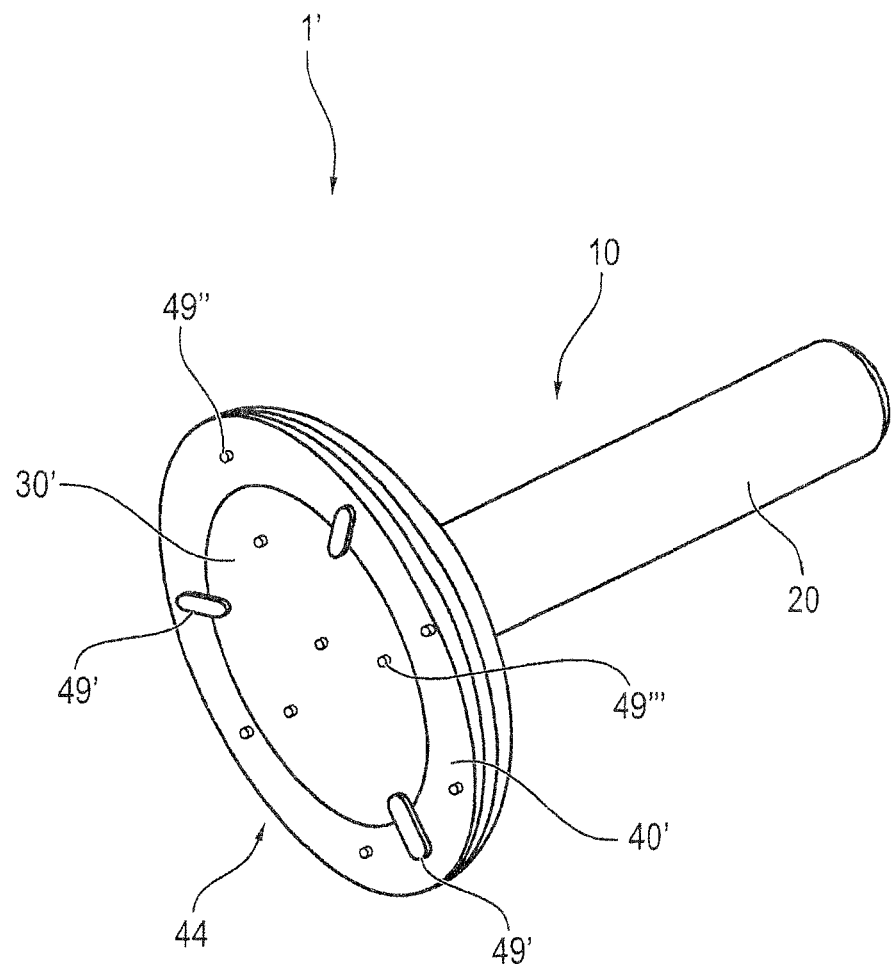
Figure 17:
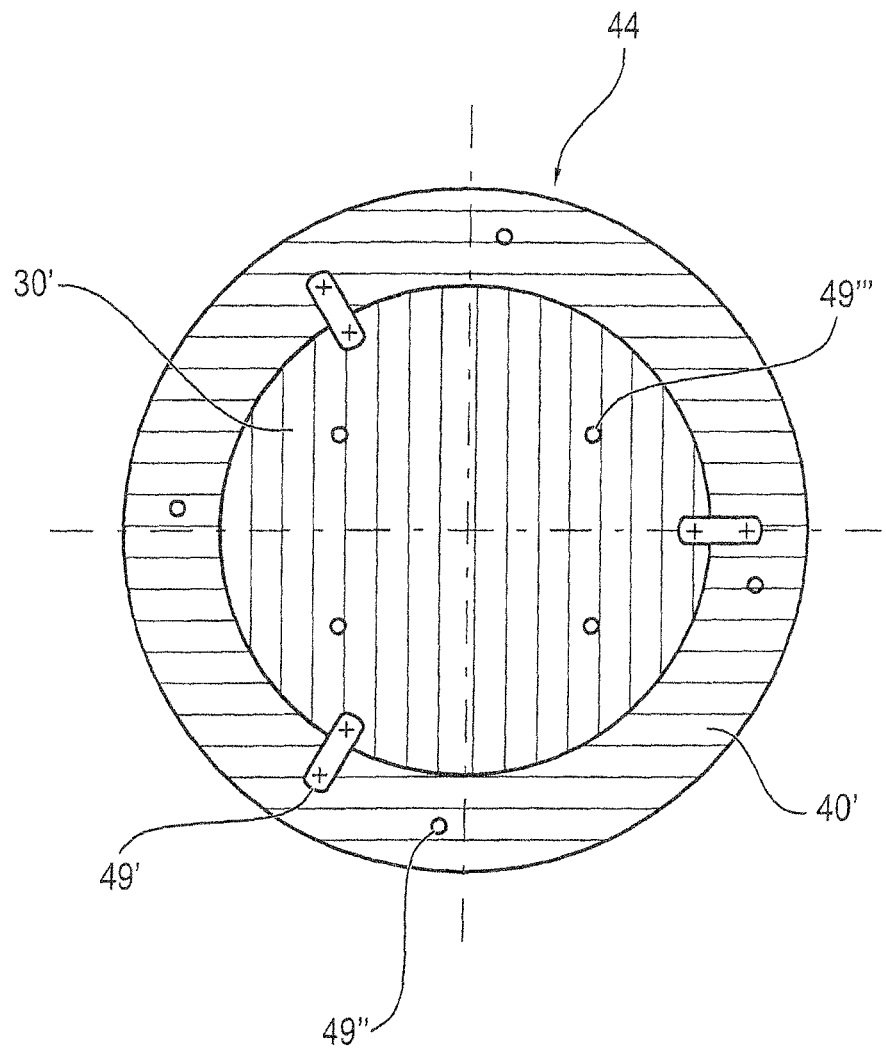
Figure 18:
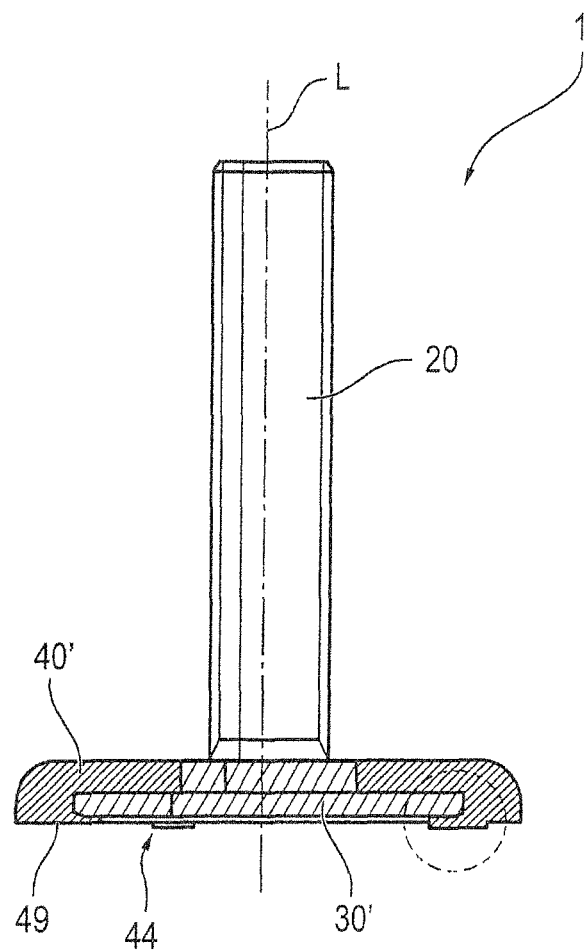
Figure 19A:
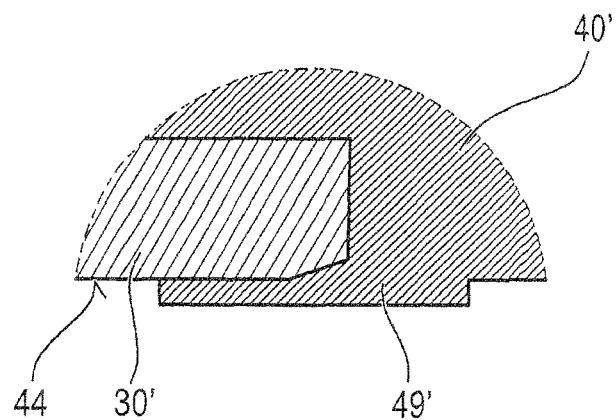
Figure 19B:
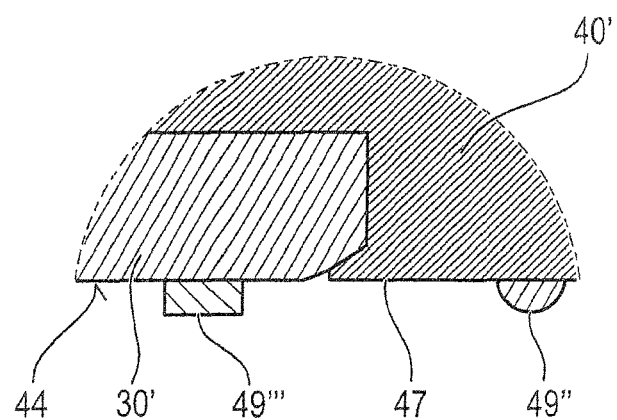
Figure 20:
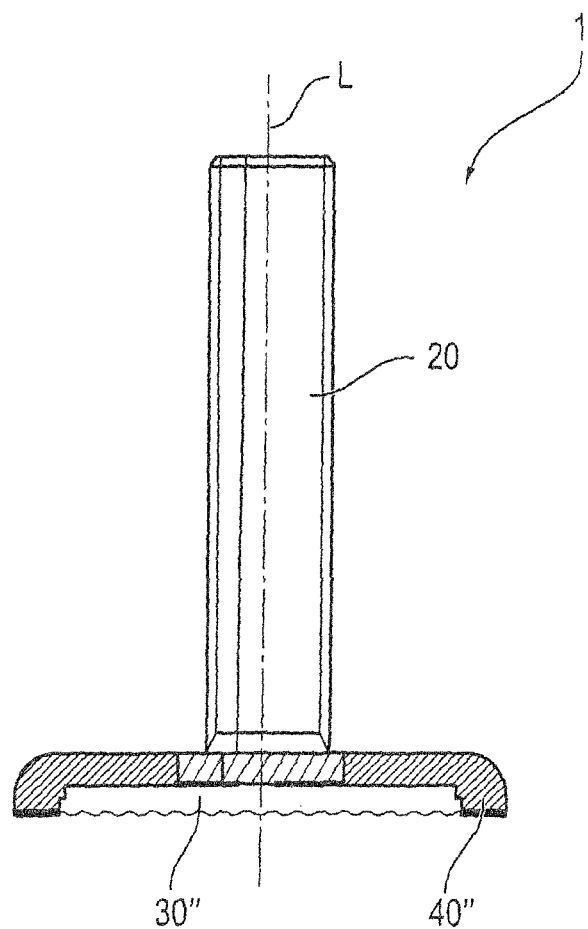
Figure 21:
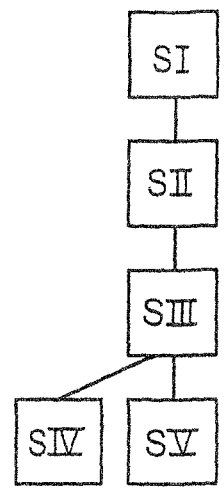

FIG. 16 shows a further preferred embodiment of the connecting element in a perspective side view, FIG. 17 shows a view from below of the connecting element of FIG. 16, FIG. 18 shows a side sectional view of the connecting element from FIG. 16, FIG. 19A shows a sectional enlargement of the encircled region in FIG. 18, FIG. 19B shows a further design of the connecting element of the encircled region in FIG. 18, FIG. 20 shows a side sectional view of a further embodiment of the connecting element, and FIG. 21 shows a flow diagram of a preferred embodiment of an attachment method for the connecting element according to FIG. 16.

DETAILED DESCRIPTION OF THE PREFERRED EMBODIMENTS

The connecting element 1 for gluing onto a component surface B, seen in cross-section, has a T-shaped structure, which can be seen in the FIGS. 1-6. This T-shaped structure comprises a disk 40 having an attachment surface 44 and a top surface 42. A retaining pin 10 is attached to the disk 40. The retaining pin 10 serves with a pin section 20 for the attachment of a structural component or an attachment, such as, for example, an interior lining or a fender of a motor vehicle, to the component surface B. The attachment surface 44 of the disk 40 is facing toward the component surface B, and is connected to the component surface B using glue.

While hot melt adhesives, or generally thermosetting/heat activated glue is widely used, the connecting element 1 according to the invention is preferably attached with light curing or with light activated glue. For this purpose, the disk 40 or the entire connecting element is composed of a transparent material, which is permeable for the wavelength range of light necessary for curing/activating the glue. It is preferred to use polycarbonate as a transparent material for the disk 40 or the entire element. It is further preferred to use all amorphous transparent plastics for the disk 40 or the entire connecting element 1.

It is further preferred to produce the transparent disk 40 in combination with a retaining pin 10 composed of non-transparent material, for example from metal (steel) or plastic. Glass or ceramic materials, which are suitable as a connecting element 1 due to their mechanical stability, corrosion resistance and their electrical properties, are also suited for the disk 40 and the retaining pin 10, or for only one of the two parts. The retaining pin 10 is preferably produced from metal with a corrosion protection and, if required, with a slide coating or screw retaining device.

The pin section 20 of the retaining pin 10 comprises a suitable attachment structure. This attachment structure is formed, for example, as a steel pin, nut body, ball pin, thread, plug connection, clamp connection, snap-on connection or the like. These various design features can also be implemented in a retaining pin 10, which is produced from the same material as the disk 40 or from a different material than the disk 40.

The connecting element 1 according to the invention, according to the preferred embodiment represented in the FIGS. 1-6, comprises the transparent disk 40 and the non-transparent retaining pin 10. With the preferred use of glue cured/activated by light, the non-transparent retaining pin 10 with the illumination of the glue using the light source 50, creates a shadow 60 on the attachment surface 44. This shadow differs depending on a vertical illumination according to FIG. 1, an illumination from the side according to FIG. 2 or a combined vertical and lateral illumination according to FIG. 3. The incident light 52 of the light source 50 is schematically represented in each case by solid lines. Light 54 penetrating into the disk 40 and light 56 reflected at the disk 40 is shown using dotted lines. The shadow 60 occurring with the illumination of the connecting element 1 leads to a non-homogeneous illumination of the attachment surface 44 specifically in the region between the attachment surface 44 and an anchor 30 of the retaining pin 10.

As already indicated above, a portion of the incident light 52 penetrates the transparent disk 40. Another portion of incident light 52 is reflected at the top surface 42 of the disk 40, and scattered into the interior of the disk. The preferred design of the disk 40 and the anchor 30 of the retaining pin 10 ensures the greatest possible light intensity at the attachment surface 44 of the disk 40, on which the glue is located. Initially, a specific surface design of the disk 40 reduces the portion of reflected light 56 in favor of the light 54 penetrating into the disk 40. This is precisely the case with the preferred irradiation of light from the side. Irradiation of light from the side in this context means that the light is irradiated at an angle <90° to the attachment surface 44 on the connecting element 1.

During the production of the disk 40, a specific surface roughness is created on the top surface 42 and/or a connecting surface 46 as a surface design. The mean roughness value for the top surface 42 and/or the connecting surface 46 is preferably in a range of 0.18 μm to 31.5 μm and further preferably in a range of 0.18 μm to 10 μm.

The surface roughness reduces the reflection of the incident light 52 so that a greater portion of the irradiated light 52 penetrates into the transparent disk 40, and thereby is further conducted to the attachment surface 44. Additionally, the incident light 56 is scattered more strongly into the disk 40 than would be the case with a smooth top surface 42 and connecting surface 46. The resulting increased portion of scattered light 54 in the disk 40 is represented using dotted lines in the FIGS. 3 and 6. Based on this, greater light intensity arrives at the attachment surface 44 than would be the case with a smooth top surface 42 and connecting surface 46. This results in a faster curing of the glue at the attachment surface 44, and thus a reduction of the cycle time during attaching the connecting element 1 onto the component surface B.

For increasing the light intensity at the attachment surface 44, it is also preferred to form the connecting surface 46 concave, as is schematically shown in FIG. 4. The connecting surface 46 circumferentially connects the top surface 42 and the attachment surface 44, wherein the disk 40 preferably has a round shape. The disk 40 can also have a rectangular or polygonal shape.

Due to the concave shape of the connecting surface 46, a lens effect arises which bundles the incident light 52, preferably the light incident from the side, in the direction onto the attachment surface 44. The radius of curvature $R_{46}$ of the concave connecting surface 46 is preferably adjusted in coordination with the incidence angle of the incident light 52. For this purpose, the concave connecting surface 46 is to be arranged laterally next to the shaded region 60 of the attachment surface 44. The lateral distance between the shaded region 60 and connecting surface 46 is determined by the material thickness x (see FIG. 4). The material thickness x must be at least so large that the anchor 30, and thus the retaining pin 10, is held reliably in the disk 40.

For concentrating the incidence of light using the connecting surface 46 onto the attachment surface 44, in order to effectively cure the glue, the radius $R_{46}$ is set so that the light is captured from all incident angles and further conducted to the attachment surface 44. For this purpose, the radius $R_{46}$ takes on values that are calculated from a total height $H_T$ of the disk 40 and a remaining wall thickness $R_T$ (see FIG. 4). According to a preferred embodiment, the radius $R_{46}$ takes on values in the following range:

$$0.6 \cdot (H_T - R_T) \leq R_{46} \leq 1.4 \cdot (H_T - R_T).$$

According to a further preferred embodiment, the radius $R_{46}$ takes on values in the following range:

$$0.8 \cdot (H_T - R_T) \leq R_{46} \leq 1.2 \cdot (H_T - R_T).$$

In addition to support the light incidence on the attachment surface 44, the anchor 30 is provided with a specific shape. First, the anchor 30 has a larger cross-section than the pin section 20, as can be seen in the FIGS. 1-8. In this manner, the anchor, molded in the disk 40, forms an undercut with respect to the longitudinal axis L of the retaining pin 10. This undercut acts removal-inhibiting and thus stabilizes the connection between the disk 40 and the retaining pin 10.

Preferably this removal inhibiting undercut is formed in one step or multiple steps, that is, widened partial regions of various thicknesses of the anchor 30 are in series in the longitudinal direction L of the retaining pin 10, as shown in the FIGS. 1-7.

The anchor 30 forms a flat or two-dimensional structure, viewed in the longitudinal direction L of the retaining pin 10. According to one embodiment of the present invention, this flat structure is formed closed. In a further embodiment of the present invention, the flat structure is broken through at least in sections, as is represented in the FIGS. 7 and 8. The at least one breakthrough 35 reduces the shadow, or respectively the shaded region 60, beneath the anchor 30 on the attachment surface 44, and thus supports the incidence of light on the attachment surface 44.

In addition, the anchor 30, viewed in the longitudinal direction L of the retaining pin 10, preferably forms a truncated cone-like shape in one partial region. This truncated cone-like region of the anchor 30 tapers in the direction of the attachment surface 44, whereby in turn, a shading of the attachment surface 44 is reduced (see FIG. 6).

According to a further embodiment of the present invention, the flat anchor 30 at a side facing toward or away from the pin section 20, or on both sides, comprises at least one web 34 projecting therefrom, running transverse to the longitudinal axis L of the retaining pin 10. Thus, FIG. 7 shows a preferred embodiment, in which radially running webs 34 are embossed in the anchor 30 formed like a truncated cone. The surfaces between the webs 34 are closed, or open by means of breakthroughs 35. It is also preferred to provide webs 34 running transverse to the longitudinal axis L, projecting in the direction of the attachment section 20, as illustrated in FIG. 8. If the disk 40 has a non-circular shape, the webs 34 can also run in a non-radial alignment, running instead perpendicular to the longitudinal axis L. The webs 34 are enclosed by material of the disk 40 in the molded state. The webs thereby act to inhibit rotation, and stabilize the connection between the disk 40 and the retaining pin 10.

According to a further preferred embodiment of the present invention, the anchor 30 is formed in the shape of an embossing 36 (see FIG. 9) or a knurling 38 (see FIG. 10). The embossing 36 and the knurling 38 are suitable, for example, if the retaining pin 10 has a hollow profile. Both the knurling 38 and also the embossing 36 provide an anti-rotation lock and anti-removal protection of the retaining pin 10 from the disk 40, when they are molded therein. In addition the knurling 38 and embossing 36 ensure a small shading of the attachment surface 44 such that the incidence of light is supported.

According to the present invention, it is also preferred that the connecting element 1 is formed integrally from a material, which can be penetrated by light, for gluing onto the component surface B. Based on this, the retaining pin 10 is formed together with the pin section 20 and the disk 40. The disk 40 also has the top surface 42 adjacent to the retaining pin 10, as well as the attachment surface 44 for placement on the component surface B. The top surface 42 is equipped with the surface roughness, described above, for scattering the incident light and/or the concave shaped connecting surface 46, which connects the top surface 42 and the attachment surface 44 with each other.

A further preferred embodiment of the disk 40 of the connecting element 1 is shown in more detail in the FIGS. 13 to 15. The perspective view of FIG. 15 shows the attachment surface 44 of the connecting element 1. It is preferred to use the design of the attachment surface 44 described in the following in conjunction with all embodiments of the connecting element 1 already described above.

The attachment surface 44 comprises a plurality of recesses or grooves 48 arranged circumferentially, which are shown in greater detail in the sectional enlargement of FIG. 14. The cross-sectional shape of the recesses 48 is angular or curvilinear. The plurality of recesses 48 is arranged adjacent to the radial outer edge of the attachment surface 44. It is also preferred to dispose a plurality of groups of circumferential recesses 48 on the attachment surface 44 that are offset to each other in the radial direction. Although a plurality of recesses 48 is shown, according to a preferred embodiment, only one recess 48 or a plurality of radially spaced individual recesses 48 is applied on the attachment surface 44.

The recesses 48 serve for anchoring the glue (not shown) on the attachment surface 44 in the cured state. Additionally, a possibly developing crack, which could lead to a detachment of the connecting element 1 from the component surface B, is diverted and/or impeded due to the recess 48. Thereby, the service life of the connection between the component surface B and the connecting element 1 is increased.

In addition, preferably at least three support points 49 projecting in the axial direction from the attachment surface 44 are provided on the attachment surface 44. These support points 49 guarantee a minimum spacing between the attachment surface 44 and the component surface B, so that at any location of the attachment surface 44, the glue cannot be squeezed out completely from the intermediate space between the attachment surface 44 and the component surface B. It is also preferred to provide four, five or six support points 49, which are arranged non-uniformly or uniformly distanced on the attachment surface. In this manner, an increased service life of the connection between the connecting element 1 and the component surface B is also supported.

The connecting element 1 described above, as represented for example in FIGS. 5 and 6, is produced using the preferred production method according to the flow diagram in FIG. 11. In the scope of this preferred production method, firstly, the retaining pin 10 is produced. According to various preferred methods for producing the retaining pin 10, a cold pressing occurs in step S1, or an embossing of a retaining pin 10 for creating an anchor 30 in step S2, or a knurling for creating the anchor 30 of the retaining pin in step S3. It is also conceivable to use other metal forming methods for producing the retaining pin 10 having a pin section 20, for example injection molding or pressure casting or die casting. According to a further method alternative, the retaining pin with the anchor is produced from plastic, for example using injection molding or another plastic forming method.

After the retaining pin 10 is produced, it is positioned in a mold for plastic forming for production and attachment of the disk 40 with its anchor 30. A light permeable plastic for creating the disk 40 is subsequently introduced into the mold, preferably injected, in order to enclose the anchor 30 of the retaining pin 10 with the plastic of the disk 40. The positioning of the retaining pin 10 in the mold occurs in step S4, while creating the disk 40 in the mold is performed in step S5.

During the molding of plastic in the mold, the top surface 42 is created adjacent to the retaining pin 10 and the attachment surface 44 for placement on the component surface B.

According to a further preferred design of the production method, during the molding of the disk 40 in the mold, in step S6, a surface roughness is created on the top surface 42 and/or the connecting surface 46 for scattering incident light 52. It is also preferred in production step S7, to form the connecting surface 46 between the top surface 42 and the attachment surface 44 concave, so that the above described bundling effect results for the incident light 52.

The present invention also comprises an attachment method for the connecting element 1 described above that preferably proceeds according to the flow diagram in FIG. 12. Glue that is light-curable is applied in a first step I onto the attachment surface 44 of the disk 40 of the connecting element 1 and/or onto the component surface. Then, in step II, the connecting element 1 is placed onto the component surface B. In step III, the glue is exposed to the light source 50 so that the glue cures, and the connecting element is attached via the attachment surface 44 to the component surface B. In the scope of exposing the glue to light in step III, preferably incident light 52 is irradiated in the longitudinal direction L of the retaining pin using light source 50 and/or light is irradiated using the light source 50 onto the connecting element 1 at an angle of <90° with respect to the attachment surface 44. The angle of incidence of the incident light 52 from the side, is preferably set so that a reflection of the incident light 52 at the top surface 42 of the disk 40 is minimized. In the scope of the exposure to light step III, it is further preferred to scatter the incident light 52 at the top surface 42 and/or connecting surface 46 due to the local surface roughness, in order to be able to thereby conduct the greatest possible portion of light of the incident light through the disk 40 to the attachment surface 44 (step V). In a further embodiment of the exposure to light step III, there is preferably a concentration/bundling of the incident light 52 at the concave-shaped connecting surface 46 (step VI), in order to optimize the light intensity onto the attachment surface 44. If there is no irradiation of light from the side, or in addition, light diverted laterally such as scattered light for example, then light is mirrored or reflected again in the direction of the connecting element 1. As a result, the light input into the connecting element 1 is increased and loss of light of the light source 50 is reduced.

FIG. 16 shows a further embodiment of a connecting element 1' according to the invention. In comparison to the connecting element 1 described above, the same elements are provided with the same reference numbers. In the same manner, the features already described above also apply to these elements.

As seen in FIG. 16, the connecting element 1' comprises a retaining pin 10 having a pin section 20, which at one end thereof has an anchor 30'. The anchor 30' is formed flat or two-dimensional, perpendicular or at an angle not equal to 90° to the longitudinal axis L of the retaining pin 10, as shown in FIG. 18. The anchor 30' on the side facing toward the pin is preferably formed stepped or smooth. The side of the anchor 30' facing away from the pin is formed smooth. This provides a part of the attachment surface 44 of the connecting element 1', as explained below.

The retaining pin 10 with the anchor 30' is produced from metal using cold pressing, a machining production method, by injection molding or pressure casting or another metal forming method. The production from plastic is also preferred.

The anchor 30' is enclosed at the side thereof facing toward the pin and radially circumferentially, by a transparent plastic, which forms the disk 40'. The transparent plastic disk 40' is preferably molded to the anchor 30' or attached in another manner. For this purpose it is possible to glue on the prefabricated disk 40', to lock in or clip-on to the anchor or to fix to the disk by friction welding to the anchor 30'. The FIGS. 19A and B show corresponding different embodiments of the connection between the disk 40' and anchor 30'. In FIG. 19A, the disk 40' is molded to the anchor 30' and encompasses the chamfered edge region of the anchor 30'. In doing so, the support point 49' is formed simultaneously.

As an alternative to this, the disk 40' is clipped onto the anchor 30', in that the disk 40' surrounds, preferably releasably, the chamfered edge region of the anchor 30' in the region 47. In addition, the optional support points 49" and 49''' are shown on the disk 40' and/or on the anchor 30'.

FIG. 16, in a perspective view, FIG. 17, in a top view of the attachment surface 44, and FIG. 18, in a side sectional view of the connecting element 1, show that the plastic disk 40' and the anchor 30' together form the attachment surface 44. Glue is later applied onto this attachment surface 44 or the component surface B in order to attach the connecting element 1'.

The transition region between the anchor 30' and the disk 40' is preferably bridged by a plurality of support points 49'. The support points 49' project perpendicularly from the attachment surface 44. If the connecting element 1' is placed onto the component surface B, the projection of the support points 49' above the attachment surface 44 defines the thickness of the layer of glue which remains between the attachment surface 44 and the component surface B, without the glue being squeezed out. It is also preferred to distribute the support points non-uniformly over the attachment surface 44'. According to different design variants, the support points 49', 49" arise due to a wave shape of the entire attachment surface 44, or a part thereof. This is shown in FIG. 20, where the anchor 30' has a wave shape on the surface thereof facing toward the component surface B. This wave shape can be implemented also in the disk 40'. A further alternative provides a graining of the anchor 30' so that the material displaced by the graining forms a material bulge at the attachment surface, which ensures the necessary spacing to the component surface B.

FIG. 19 shows an enlarged representation of the encircled region from FIG. 18. The projection of the support point 49' beyond the attachment surface 44 can be seen in FIG. 19. In addition, the disk 40' is arranged in a circumferential region of the anchor 30' and merges to some extent into the support points 49'. In this manner, the support points 49' for example produce a clipped connection between the disk 40' and the anchor 30'. The support points 49" and 49''' shown can, however, also be provided outside of the transition region on the disk 40' and/or on the anchor 30' (see FIG. 16, 17).

The anchor 30', in the circumferential region thereof, is preferably chamfered on the side facing away from the pin. This guarantees that irradiated light for activating the glue can also penetrate beneath the anchor 30' to some extent, if light is irradiated from the side. The anchor 30', due to the shape thereof, forms an undercut in the axial direction such that the retaining pin 10 with the anchor 30' cannot be pulled out of the disk 40'. It is also preferred to provide the anchor 30' with breakthroughs in the direction of the longitudinal axis L of the retaining pin 10. Such breakthroughs (not shown) can be holes, or flat structures up to the outer edge of the anchor 30'. In this manner, additional light can be irradiated onto the attachment surface 44 and the glue located there. Additionally, the plastic of the disk 40' would engage in this region, and form an antirotation lock between the disk 40' and the anchor 30'.

As seen in FIG. 17, the attachment surface of the connecting element 1' is formed by the side of the anchor 30', composed of metal, facing away from the pin and the circumferential edge of the disk 40', composed of transparent plastic. The portions of area of the attachment surface 44 taken up respectively by the disk 40' and the anchor 30' can be adjusted according to the requirements for attaching the connecting element 1' onto the component surface B. The portion of area of the disk 40' on the attachment surface 44 serves for the first fixing of the connecting element 1' onto the component surface B. For this purpose, the attachment surface 44 is provided with a glue that can be activated using light. After placement of the attachment element 1' onto the component surface B, light is irradiated onto the connecting element 1'. Because the light penetrates the plastic of the disk 40', the glue cures at least for a first fixing in the disk region of the attachment surface 44. In this manner, the connecting element 1' is initially fixed, in order to be transported, more easily handled, or otherwise processed. (see FIG. 21)

Subsequently, heat is supplied preferably to the connecting element 1' and thus to the glue on the attachment surface 44, in order to completely cure the glue and fix the connecting element 1'. The heat is supplied by a heat source in the surroundings, by placing the connecting element in an oven, by guiding the connecting element 1' through an environment heated with respect to room temperature, or by the surrounding/room temperature itself. With this process, the retaining pin 10 composed of metal and the anchor 30' connected thereto, ensure a good thermal conductivity and the further conduction of the heat to the attachment surface 44. The same applies to the component surface B, which also further conducts supplied heat, or heat present in the surroundings, to the attachment surface 44. There, particularly the anchor 30' contributes as a heat radiating area for curing the glue, which cures by means of heat and attaches the connecting element 1' onto the component surface B.

It is also preferred to cure the glue only over a period of time and without supplying additional energy.

REFERENCE LIST 1, 1' connecting element
10 retaining pin
20 pin section
30, 30' anchor
32 enlargement
34 web
35 breakthrough
36 embossing
38 knurling
40, 40' disk
42 top surface
44 attachment surface
46 connecting surface
48 recess
49, 49', 49", 49'" support point
50 light source
52 incident light
54 scattered light
56 reflected light
60 shaded region
$H_T$ total height of the disk 40
$R_T$ remaining wall thickness of the disk 40
x material thickness
B component surface
L longitudinal axis

The invention claimed is:

1. A connecting element for gluing onto a component surface, so that a part can be fastened thereto, said connecting element comprising:
   a. a retaining pin having a pin section, to which the part can be fastened, and an anchor, and
   b. a disk made of a light-penetrable material, wherein the retaining pin is fastened via the anchor, having a rotation-inhibiting and removal-inhibiting shape, such that due to the anchor, the retaining pin is arranged in the disk secured against rotation and removal.

2. The connecting element according to claim 1, in which the anchor has an undercut with respect to a longitudinal axis of the retaining pin, in the shape of a lateral, radial enlargement.

3. The connecting element according to claim 2, in which the anchor comprises at least one of an embossing and a knurling which provides an anti-rotation lock and an anti-removal protection.

4. The connecting element according to claim 2, wherein the anchor is arranged as a flat structure which is transverse or at an angle not equal to 90° with respect to the longitudinal axis of the retaining pin, and is formed closed or interrupted at least to some extent in the longitudinal direction of the retaining pin.

5. The connecting element according to claim 4, wherein the flat anchor has at least one web on at least one side facing away or toward the pin section and projecting therefrom and that runs transverse to a longitudinal axis of the retaining pin and forms an anti-rotation lock of the anchor in the disk.

6. The connecting element according to claim 5, the flat anchor of which is formed round and at the side thereof facing away from the pin section, a plurality of webs runs in the radial direction of the anchor.

7. The connecting element according to claim 1, in which the anchor is arranged as a flat structure transverse or at an angle not equal to 90° with respect to a longitudinal axis of the retaining pin, and is formed closed or interrupted at least to some extent in the longitudinal direction of the retaining pin.

8. The connecting element according to claim 7, the flat anchor of which has on a side facing toward or away from the pin section, or on both sides, at least one web projecting therefrom, that runs transverse to the longitudinal axis of the retaining pin, and that forms an anti-rotation lock of the anchor in the disk.

9. The connecting element according to claim 8, the flat anchor of which is formed round and at the side thereof facing away from the pin section, a plurality of webs runs in the radial direction of the anchor.

10. The connecting element according to claim 1, wherein the disk has a top surface adjacent to the retaining pin and an attachment surface for placement on the component surface, the top surface having a surface roughness for scattering incident light.

11. The connecting element according to claim 10, wherein the top surface and the attachment surface are connected via a circumferential connecting surface, said circumferential connecting surface being formed concave at least to some extent.

12. A connecting element composed of a light penetratable material for gluing onto a component surface, such that a part can be fastened thereto, said connecting element comprising:
   a. a retaining pin with a pin section, to which the part can be fastened, and
   b. a disk, having a top surface adjacent to the retaining pin and an attachment surface for placement on the component surface, wherein the top surface has a surface roughness for scattering incident light and/or a concave formed connecting surface, which connects the top surface and the attachment surface with each other.

13. A connecting element for gluing onto a component surface, such that a part can be fastened thereto, said connecting element comprising:
   a retaining pin having a pin section, to which the part can be fastened, and an anchor, which is arranged as a flat structure transverse, or at an angle not equal to 90°, with respect to a longitudinal axis of the retaining pin, and is formed closed or interrupted at least to some extent in the longitudinal direction of the retaining pin,
   a disk made of a light penetrable material, wherein the retaining pin is fastened via the anchor, having a removal-inhibiting shape, such that due to the anchor, the retaining pin is arranged in the disk secured against removal, wherein
   an attachment surface of the connecting element is composed in an inner region of the anchor and in an outer region of a material, which can be penetrated by light.

14. The connecting element according to claim 13, wherein the anchor is enclosed on the side facing toward the retaining pin and along the periphery of the anchor by a plastic layer, which forms the disk.

15. the connecting element according to claim 14, that on an attachment surface thereof has a plurality of uniformly distributed support points, which bridge a transition region between the disk and anchor, or are arranged on at least one of the anchor and the disk.

16. The connection element according to claim 15, wherein the anchor is chamfered in the outer edge region at the side facing away from the retaining pin, in order to support the attachment of at least one of the support points and the disk.

17. The connecting element according to claim 14, wherein the anchor is chamfered in the outer edge region at the side facing away from the retaining pin, in order to support the attachment of at least one of the support points and the disk.

18. The connecting element according to claim 13 wherein the attachment surface has a plurality of uniformly distributed support points, which bridge a transition region between the disk and the anchor, or are arranged on at least one of the anchor and the disk.

19. The connecting element according to one of claim 18, wherein the anchor is chamfered in the outer edge region at the side facing away from the retaining pin, in order to support the attachment of at least one of the support points and the disk.

20. The connecting element according to claim 18, wherein the anchor is chamfered in the outer edge region facing away from the retaining pin, in order to support the attachment of at least one of the support points and the disk.

* * * * *